United States Patent [19]

Pekarske

[11] Patent Number: 5,146,452
[45] Date of Patent: Sep. 8, 1992

[54] METHOD AND APPARATUS FOR RAPIDLY RESTORING A COMMUNICATION NETWORK

[75] Inventor: Robert J. Pekarske, Plano, Tex.

[73] Assignee: Alcatel Network Systems, Inc., Richardson, Tex.

[21] Appl. No.: 604,846

[22] Filed: Oct. 26, 1990

[51] Int. Cl.[5] .............................................. H04J 3/14
[52] U.S. Cl. .................................. 370/16; 370/13; 370/85.1; 370/94/1; 371/8.1; 371/11.1; 371/11.2; 379/2; 379/221; 379/273; 379/274
[58] Field of Search ............... 370/16, 94.1, 13, 13.1, 370/85.12, 85.15; 371/8.1, 11.1, 11.2; 379/2, 221, 273, 274

[56] References Cited

U.S. PATENT DOCUMENTS

| | | | |
|---|---|---|---|
| 4,284,852 | 8/1981 | Szybicki et al. | 379/221 |
| 4,853,927 | 8/1989 | Wenzel | 370/16 |
| 5,029,158 | 7/1991 | Reid et al. | 370/13.1 |
| 5,031,093 | 7/1991 | Hasewaga | 370/16 X |
| 5,058,105 | 10/1991 | Mansour et al. | 370/16 |

*Primary Examiner*—Douglas W. Olms
*Assistant Examiner*—Russell W. Blum
*Attorney, Agent, or Firm*—Bruce C. Lutz; Dennis O. Kraft

[57] ABSTRACT

The present invention provides an approach to reconnect a communications network such as a DS3 telephone-type network when a span of DS3 channels is rendered inoperative, such as by cutting, within the 1.5 second time frame necessary to prevent disablement of local offices. This is accomplished by preplanning a restoration connection for each possible operating link failure in each span using spare capacity. A dedicated (DS3) communication loop is used to inform all nodes in the network substantially simultaneously to implement their portion of a plan associated with the failed span. After the restoration occurs for a given failed span, the concept can be extended to start planning for further failures or can be designed to restore further failures on a real time basis.

15 Claims, 10 Drawing Sheets

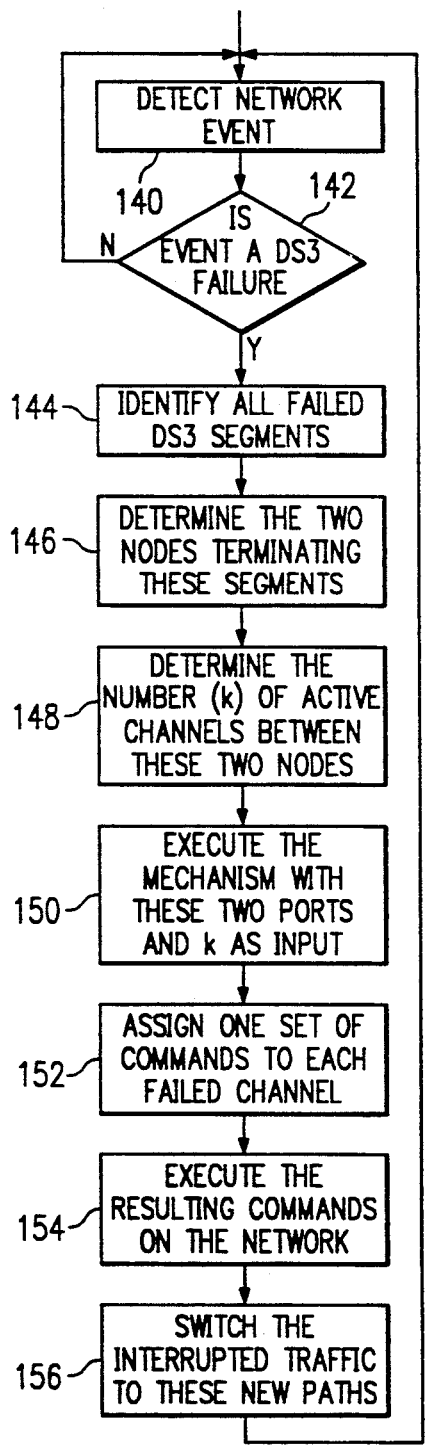
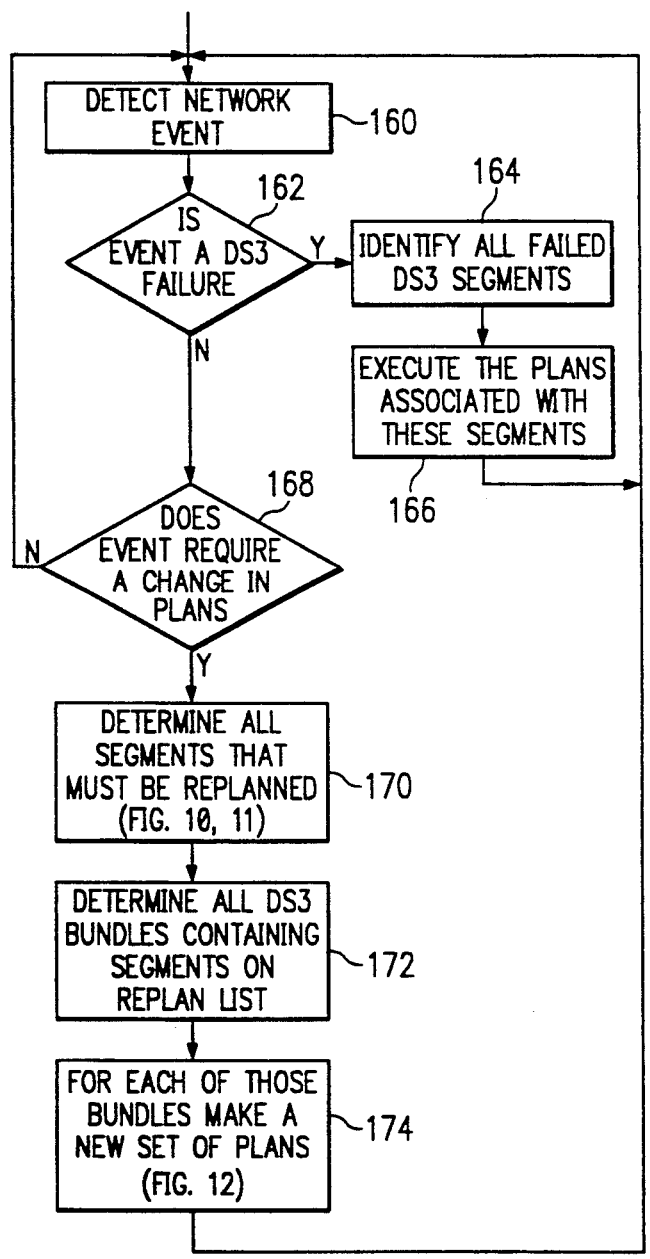
FIG. 8
(PRIOR ART)
FIG. 9

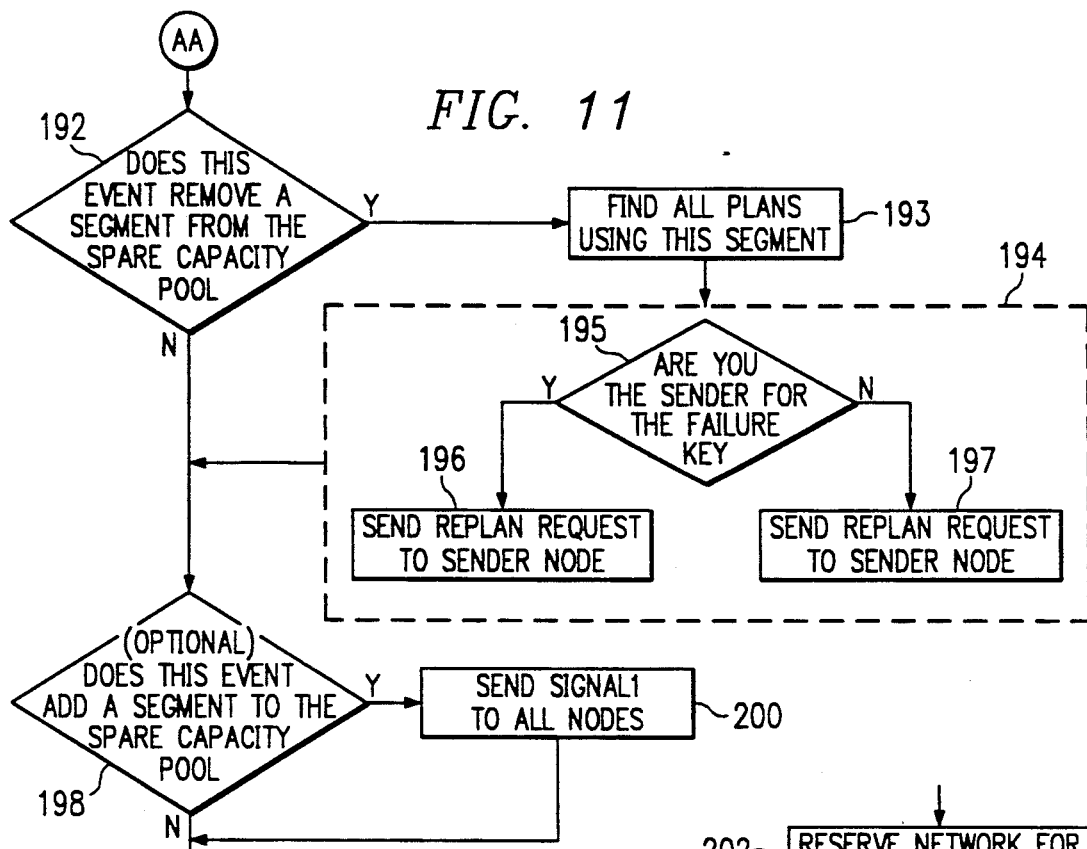

FIG. 17

|  | SIGNAL CHANGES TO SEARCH | SIGNAL CHANGES TO COMPL | SIGNAL CHANGES TO AVAIL | HOP COUNT DECREASES IN SEARCH | COMMAND RCVD: START SEARCH | COMMAND RCVD: START AVAIL | COMMAND RCVD: START COMPL |
|---|---|---|---|---|---|---|---|
| 17A RECEIVE AVAIL, SEND AVAIL | ALERT: PATH HUNT REQUEST  RECEIVE SEARCH, SEND AVAIL | — | — | — | SEND SIGNATURE  RECEIVE AVAIL, SEND SEARCH | — | — |
| 17B | — | — | ALERT: SEARCH ABORT  RECEIVE AVAIL, SEND SEARCH | ALERT: PATH HUNT REQUEST | SEND SEARCH | — | SEND COMPL |
| 17C RECEIVE SEARCH, SEND AVAIL | — | — | — | — | RECEIVE SEARCH, SEND SEARCH | — | RECEIVE SEARCH, SEND COMPL |
| 17D RECEIVE SEARCH, SEND COMPL | — | ALERT: PATH FOUND  RECEIVE COMPL, SEND SEARCH | — | — | — | — | — |
| 17E RECEIVE AVAIL, SEND SEARCH | ALERT: PATH HUNT REQUEST  RECEIVE SEARCH, SEND SEARCH | ALERT: PATH FOUND  RECEIVE COMPL, SEND SEARCH | ALERT: SEARCH ABORT  RECEIVE AVAIL, SEND SEARCH | ALERT: PATH HUNT REQUEST | — | SEND AVAIL  RECEIVE AVAIL, SEND AVAIL | — |
| 17F RECEIVE SEARCH, SEND SEARCH | — | — | — | — | — | SEND AVAIL  RECEIVE SEARCH, SEND AVAIL | SEND COMPL  RECEIVE SEARCH, SEND COMPL |
| 17G RECEIVE COMPL, SEND SEARCH | — | — | — | — | — | — | — |

METHOD AND APPARATUS FOR RAPIDLY RESTORING A COMMUNICATION NETWORK

The present invention is generally directed to electronics and more specifically directed to communication networks. Even more specifically, the invention is directed to a method of identifying potential corrective (link restoration) measures to be taken in the event of a link failure, and the implementation of such corrective action after detection of a link failure.

BACKGROUND

Whether caused by a backhoe, an ice storm or a pack of hungry rodents, losing a span or bundle of communication channels such as DS3 telephone channels means losing significant revenues. After the first 1.5 seconds of an outage, there is also a significant risk that the outage may disable one or more local offices in the network due to an excess of carrier group alarms. Even if traffic could be rerouted before repair of the lost span occurred, restoration of a disabled local office can also take a very long time. Although there are in existence approaches for restoring a network after a failure has occurred, such as shown in U.S. Pat. No. 4,956,835, issued Sep. 11, 1990, in the name of Wayne D. Grover, such a restoration process takes much longer than the 1.5 seconds referenced above which can cause disablement of a local office. Such a restoration process as disclosed by Grover may be used as a backup whenever a preneed plan has not been formulated and a break occurs.

The present invention accomplishes the desired end result by preplanning, according to internal algorithms, a restoration connection for each possible link failure. The method assumes that all links in a span will fail simultaneously, and so finds restoration connections for this (worse case) scenario. When a failure is noted, a dedicated communication loop is used to inform all nodes in the network to implement their portion of a plan associated with the link in the failed span. In order for the present concept to work, the system needs to have adequate spare capacity in the spans connecting each of the nodes. Further, the (broadcast) internode communication used in implementing the restoration algorithm needs to be substantially instantaneous, so a broadcast mechanism is required to all nodes in the network.

The present concept solves this problem by separating the operation into two parts of planning and recovery. The planning step is time consuming, and it must be completed before the failure happens. In the planning step, a set of emergency plans are calculated for each possible payload or traffic (active circuit) link failure in the network.

When a given link fails, the cross-connects or nodes on each end of the failed link detect the failure. The two nodes detecting the failure are at that moment denoted as custodial nodes and these nodes transmit an alarm message to every other node in the network. Each of these other nodes retrieves a precomputed recovery plan associated with the failed link and alternate paths are connected throughout the network according to these precomputed plans. Traffic is rerouted onto the alternate paths, and the recovery is complete. Although not a part of the present invention, the concept can be extended so that preplanning instantaneously commences to prepare for the possibility of a further break before the first break is repaired since fixing a "cut" line normally takes considerable time. If a further failure occurs before the replanning is completed or if further planning is not implemented until the repair is complete, an algorithm similar to that used for the planning process originally, and possibly somewhat like the referenced patent to Grover, may optionally be used to restore some of the circuits in the further failed span if there is sufficient additional spare capacity to accomplish such a task.

SUMMARY OF THE INVENTION

The present invention thus comprises the concept of connecting a plurality of nodes such as cross-connects in a communication circuit network with a dedicated control channel interconnecting all nodes, and with there being spare capacity between a sufficient number of nodes to accommodate at least some rerouting of traffic in accordance with a preplan need immediately upon detection of a break in a traffic span in the network so as to restore circuit continuity within a predetermined maximum time.

It is thus an object of the present invention to provide an improved communication failure detection, isolation and recovery scheme or algorithm.

Other objects and advantages will be apparent from a reading of the specification and appended claims in conjunction with the drawings wherein:

FIG. 8 illustrates a flow diagram of the algorithm used by a present prior art concept typified by the referenced patent;

FIG. 9 illustrates a flow diagram for the operation of the present concept at a system level;

Figure 10:
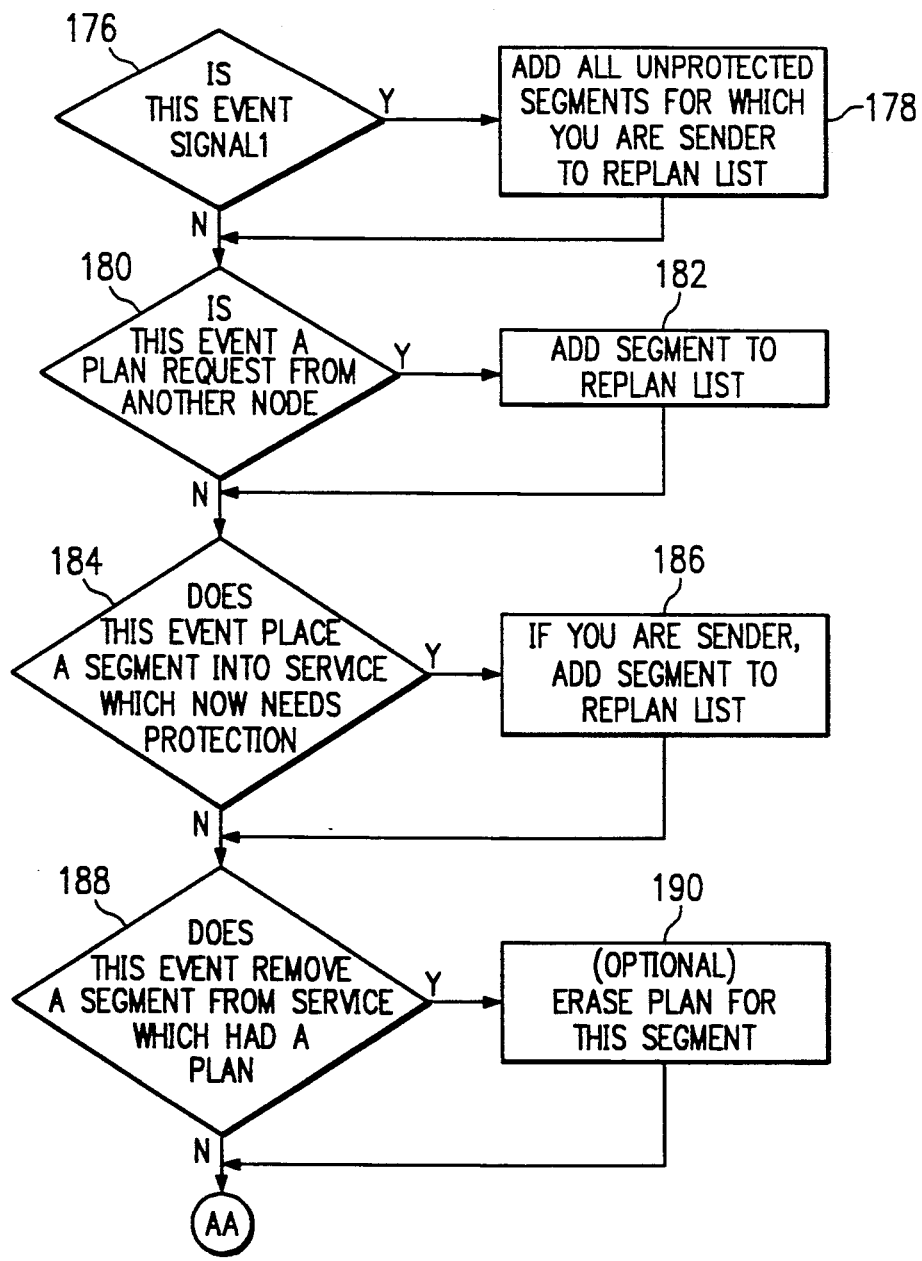
Figure 13:
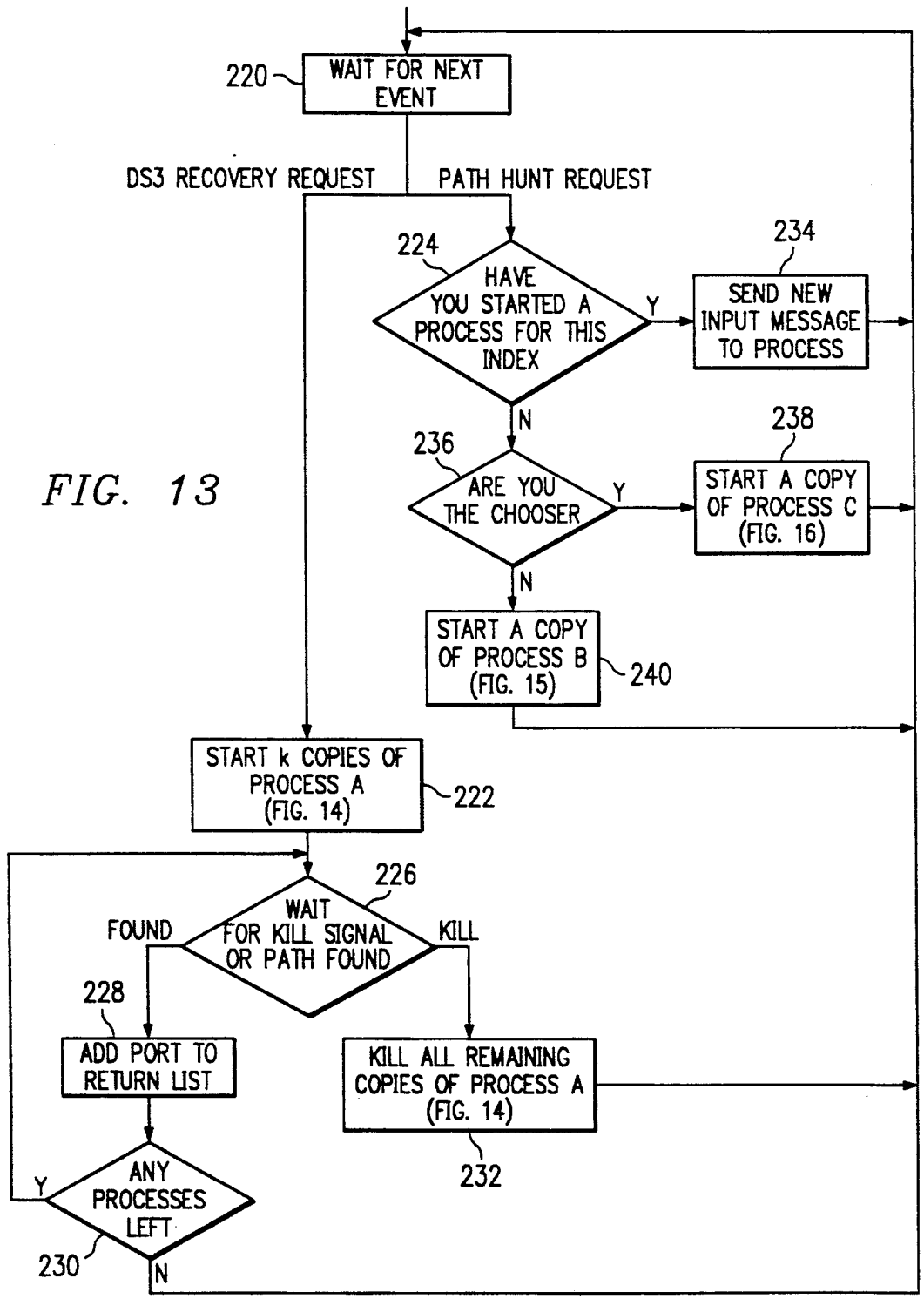
Figure 14:
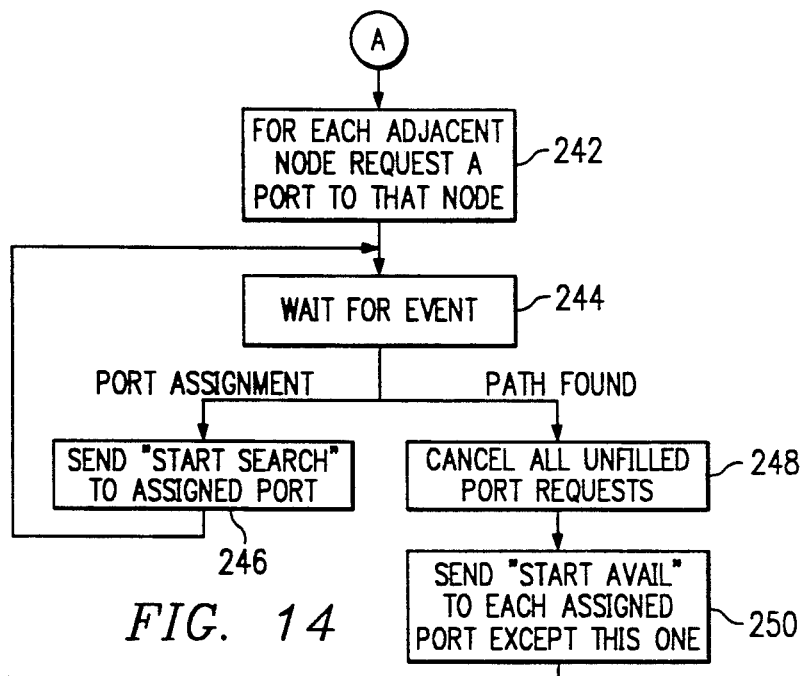
Figure 16:
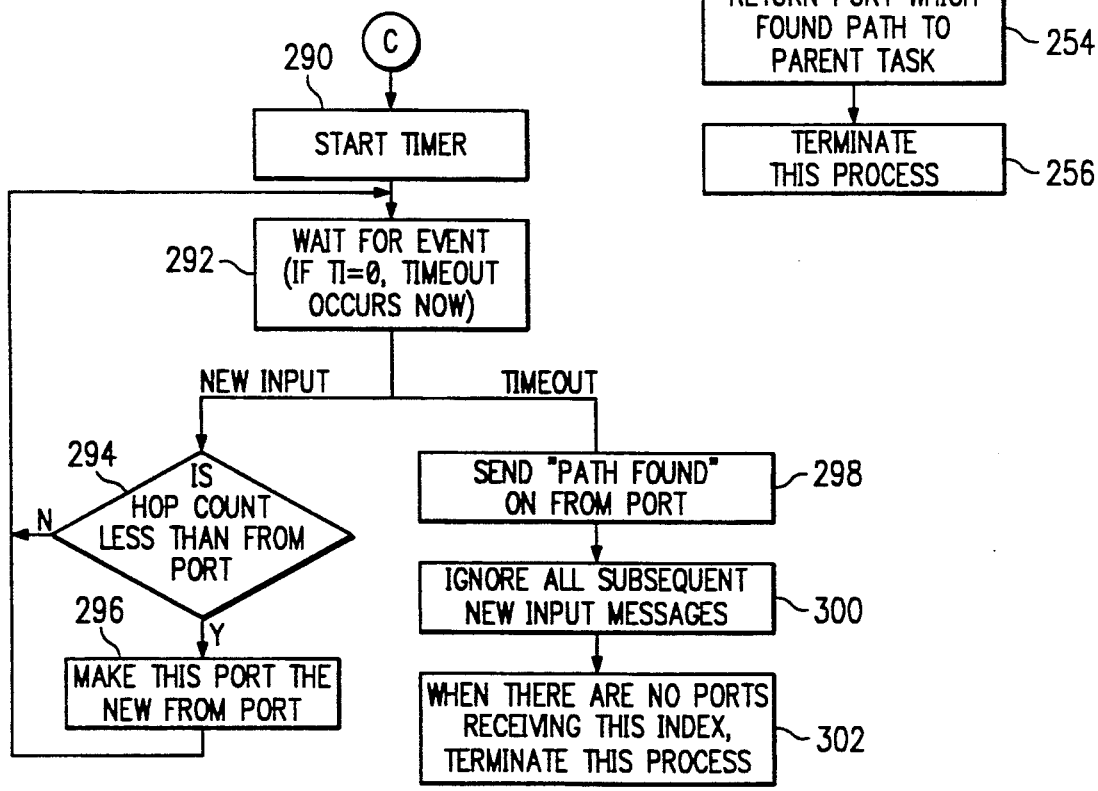
Figure 15:
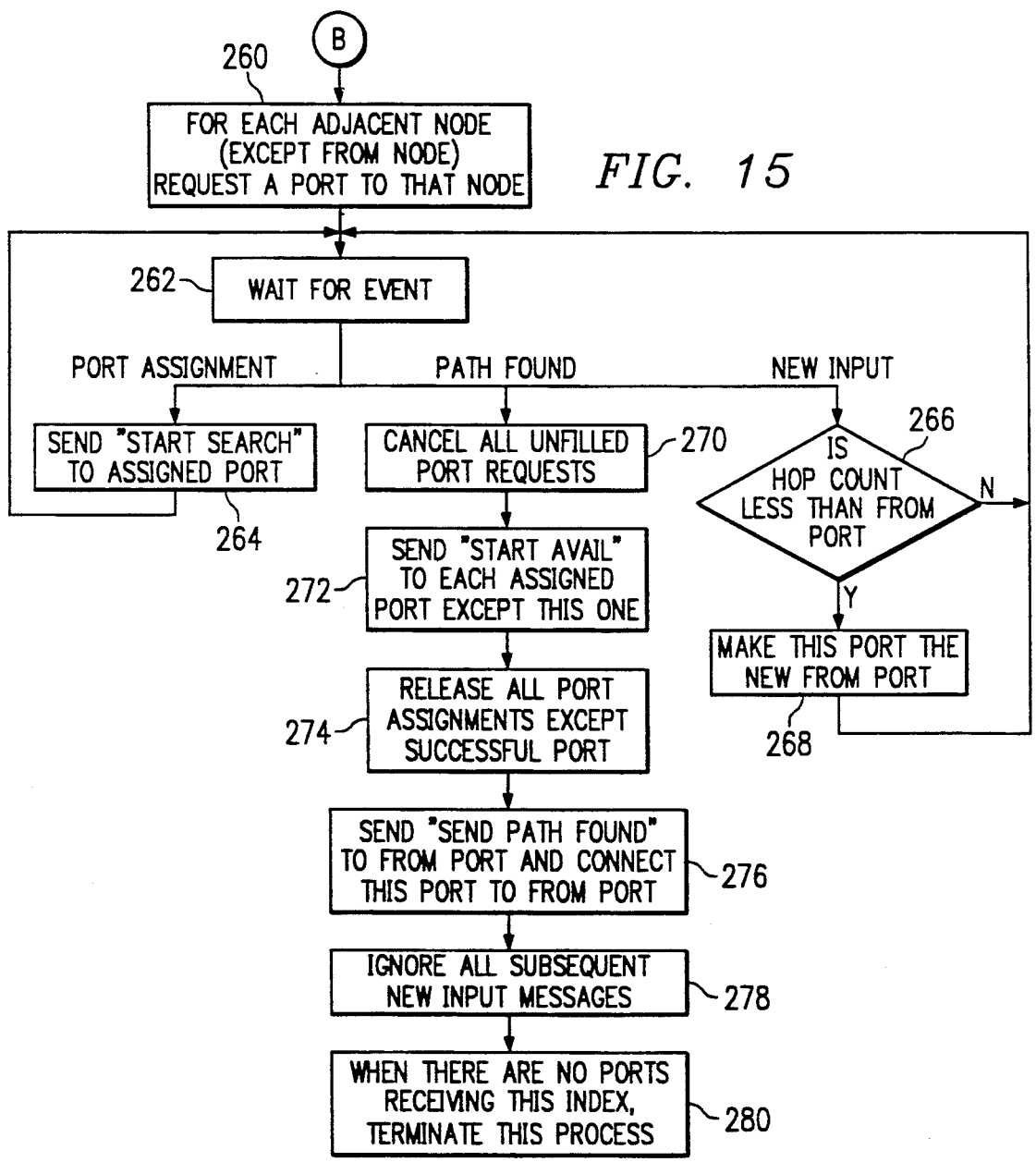

FIGS. 10, 11, and 12 provide an expansion for some of the blocks within FIG. 9;

FIG. 13 provides a flow diagram of the preplanning mechanism on a system level for providing the protection paths using the spare capacity of the network;

FIGS. 14 through 16 provide flow diagrams of the three subordinate processes referenced in FIG. 13;

FIG. 17 is a state transition table describing the result of a signal change detected by each individual port comprising a part of the spare capacity pool, and if appropriate, the next action that would occur at that port as a result of the algorithms by which the software controlling that port is written.

DETAILED DESCRIPTION

The present inventive concept lies in an approach to reconnecting a communication network having adequate spare capacity in the network to allow such reconnection in alternate paths upon the loss of a given span. This reconnection is provided quickly as the result of a preplanning process which stores information regarding the actions that must be taken at each node so that when a specific failure is announced or broadcast through the control network, the restoration can occur quickly. An implementation of the present concept used Rockwell International RDX-33 cross-connects, and thus the Detailed Description will feature cross-connects designed according to a specific Rockwell cross-connect design. However, the concept can be applied to any node having switching capability along with data storage and operating as a smart terminal to implement an algorithm in accordance with the present teachings.

Figure 1:
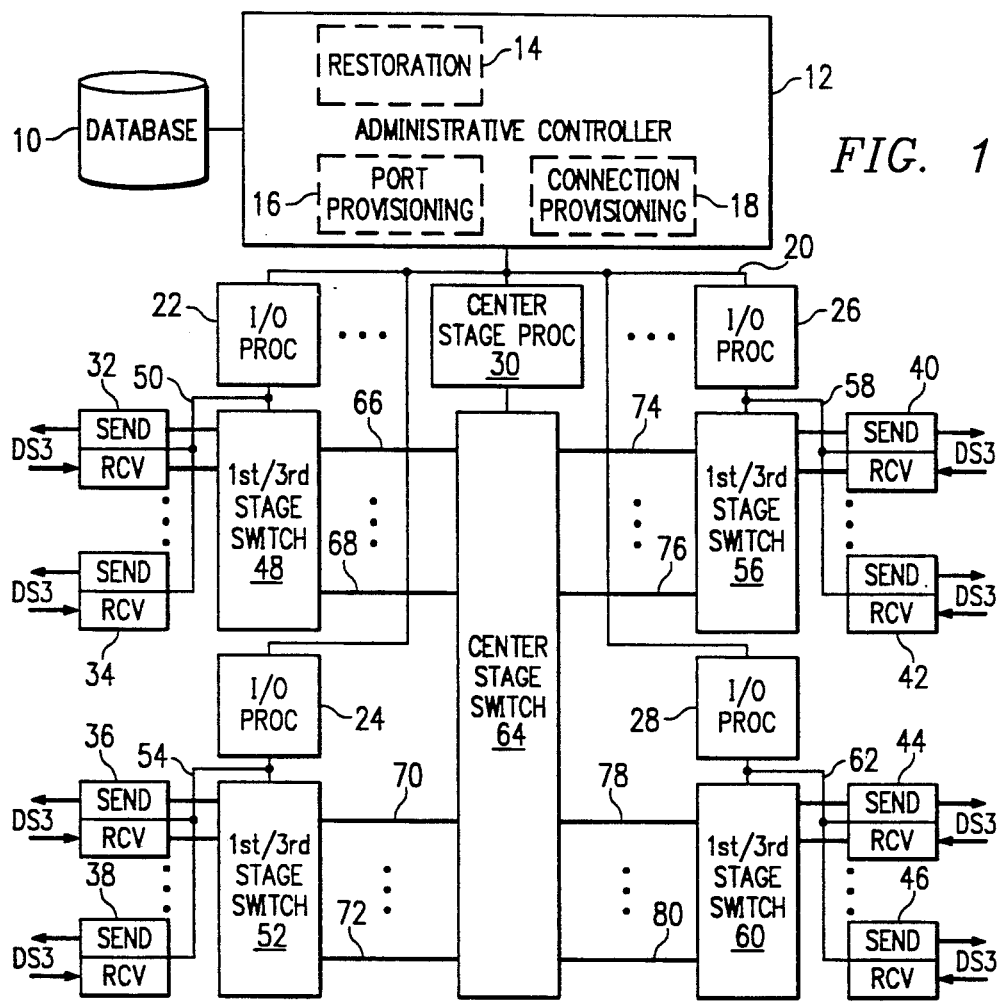
FIG. 1 is a block diagram of a single node or cross-connect utilized in each of the nodes of a network practicing the present inventive concept.

In FIG. 1, a database is designated as 10 interacting with an administrative controller 12 containing internally a restoration algorithm 14, port provisioning 16 and connection provisioning 18. The administrative controller 12 is connected via a lead 20 to a plurality of I/O processors 22, 24, 26 and 28, as well as being connected to a center stage processor 30. The path 20 is a multi-lead path but is shown in light lines to differentiate the control signal leads from the traffic or payload signal paths. As illustrated, a plurality of DS3 signals are applied to various sender-receiver ports such as blocks 32, 34, 36, 38, 40, 42, 44 and 46. The dots between blocks 32 and 34 indicate a plurality of additional DS3 duplex lines. All of the DS3 lines in the group from block 32 to 34 are applied through a 1st/3rd stage switch 48 which receives control signals from the I/O processor 22 via a control lead 50 which is also applied to each of the send-receive blocks in that group such as 32 and 34. The DS3 lines from 36 through 38 are applied to a further 1st/3rd stage switch 52 which is connected to receive control signals via a lead 54 from I/O processor 24. This control line 54 is also applied to each of the send-receive ports from 36 through 38. The set of DS3 or traffic lines from 42 through 48 are supplied to a 1st/3rd stage switch 56 which receives control signals via a lead 58 which is also applied to each of the ports from 40 to 42. The set of DS3 lines from blocks 44 through 46 are applied to a 1st/3rd stage switch 60 which receives control inputs from I/O processor 28 via a lead 62 which lead is also applied to each of the send-receive ports from 44 through 46. Each of the 1st/3rd stage switches such as 48, 52, 56 and 60 are connected to a center stage switch 64 via various leads such as 66 through 80 and the additional leads not shown but represented by dots between the various lead sets. The Rockwell RDX-33 is a 3-stage space division type switch the operation of which is generally known by those skilled in the art and FIG. 1 is merely illustrated as an example of an intelligent switching node.

Figure 2:
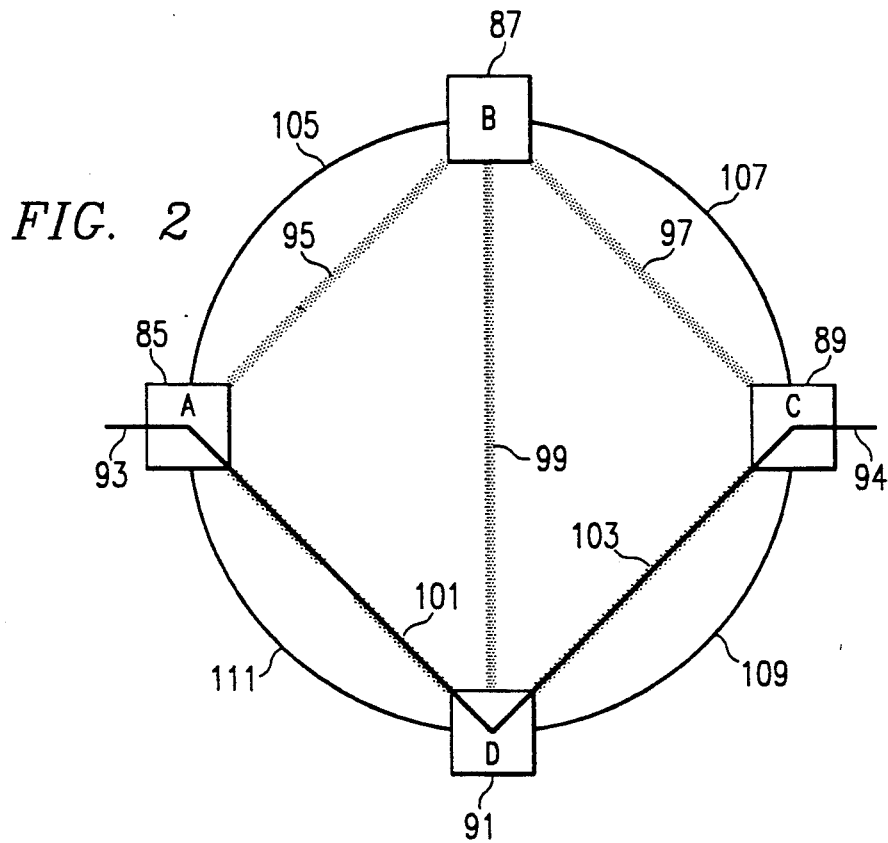
FIG. 2 illustrates a very simple network where there is initially a solid line connection between nodes A and C through node D, and which has spare capacity between other nodes illustrated as shaded lines.

In FIG. 2 a plurality of nodes 85, 87, 89 and 91 are presented. Each of these nodes may be considered to be operationally identical to that of FIG. 1. A specific DS3 line is shown input to node 85 and output from node 89. This DS3 channel is labeled 93 at one end and 94 at the other. Shaded lines such as 95, 97, 99, 101 and 103 illustrate spare communication capacity between each of the nodes from 85 through 91. The channel 93 is superimposed upon top of the additional spare capacity in the interconnections designated as 101 and 103 from node 85 to 91 to 89. As will be noted, the nodes 85 through 91 are designated as A,B,C and D, respectively, for ease of reference as to signal paths. A control communication path, broadcast path or C-ring is shown from node A to B and designated as 105. Additional paths 107, 109 and 111 are also designated as illustrated. This control communication path in one embodiment of the invention uses dedicated spare capacity in the communication network and provisions are made for this control channel being severed or lost at the same time as an operating span is cut such as span 101. However, it should be realized that typical networks will have many more nodes and that the control path between A and D may traverse one or more different links and nodes other than the direct link from A to D shown in FIG. 2. The cutting of one bundle will not necessarily affect another bundle, and thus, the control communication path such as 111 will not necessarily be cut when there is a loss of the communication between nodes A and D thereby interrupting service on the communication channel designated as 93-94 (ADx).

Figure 3:
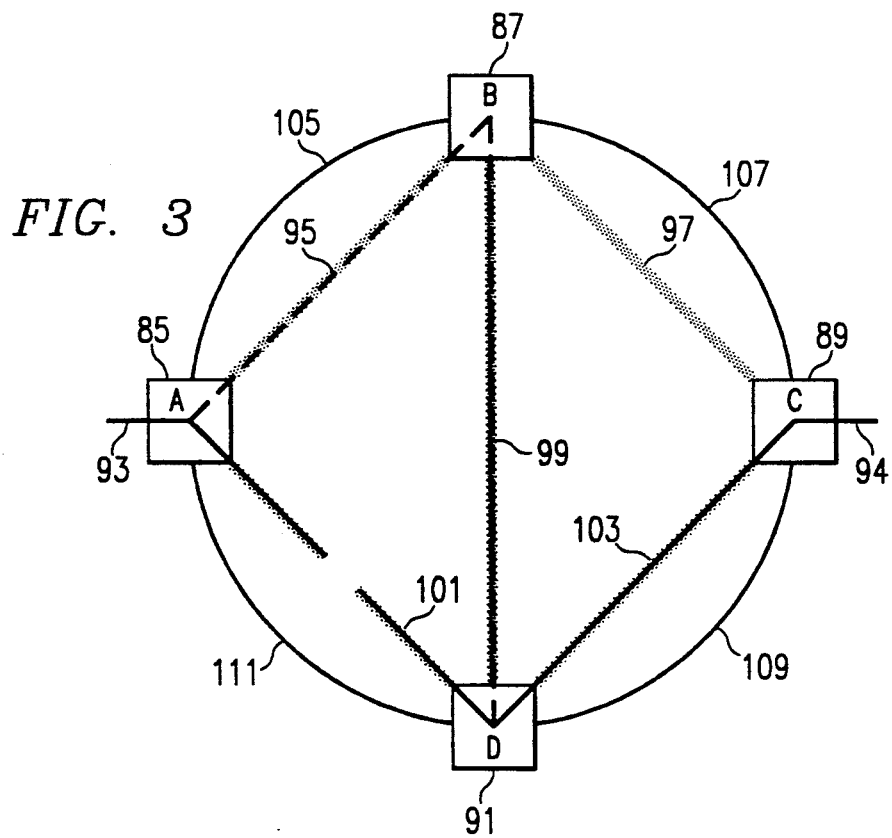
FIG. 3 illustrates a plan generated for the possibility of a cut in the span AD.

FIG. 3 illustrates the simple network presented in FIG. 2 with a cut in the line from A to D, and a potential alternate path from A to B to D utilizing part of the spare capacity in spans 95 and 99 to provide the connection of communication from the input 93 at A to the output 94 at C. The same designators as in FIG. 2 are used in FIG. 3. FIG. 3 illustrates the plan with the information stored at each node for what should be done if information is supplied on the control channel that there is a break in the span 101 between A and D. In other words, upon a communication through the control network comprising leads 105 to 111 that there is a break in 101, node A will roll the connection of ADx to ABy, where x and y are specific preassigned communication channels connecting a given set of nodes. The portion of the plan in node B would indicate that upon receipt of the information, it should connect the ABy channel to the BDz channel or output port. Node C would have nothing stored with respect to this break and thus, it would do nothing. Node D, on the other hand, would roll the port designated as ADx to BDz so as to provide a finished connection from 93 to 94 from A to B to D to C.

Figure 4:
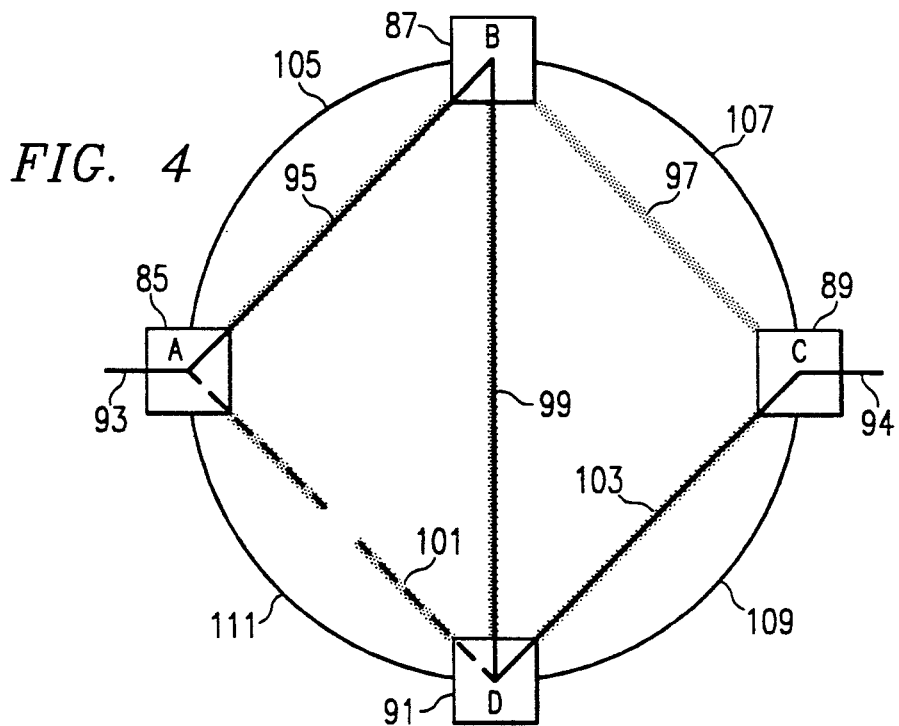
FIG. 4 illustrates the implementation of the plan in the event of a cut of the span AD.

In FIG. 4, the same designators will be used as were used in FIGS. 2 and 3. FIG. 4 illustrates the connection of the network as regards the communication path from 93 to 94 after the plan is executed as a result of nodes A and D detecting failure of the path 101, and issuing a signal to that effect on the communication ring 105 through 111. When the nodes see the ADx failure signal on the C-ring, they execute their portion of the Adx plan. Thus, the solid lines on path 101 between A and D is now changed to dash lines to indicate that the previous connection is no longer in existence and the solid line within bundles 95 and 99 indicate the alternate path of the connection from 93 to 94.

Figure 5:
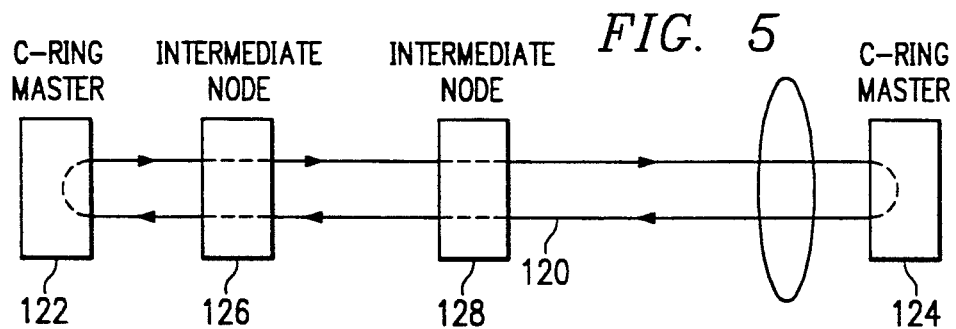
FIG. 5 is used in explaining the operation of one possible implementation of a control signal (C-ring) network between the various nodes for both the planning and the restoral process.

FIG. 5 illustrates a potential implementation of the control communication channel where the topology of the control or administrative communication channel is a loop. In one embodiment, this control channel was called a C-ring, and this terminology will be used henceforth. Physically, the C-ring loop is built of one full duplex DS3 path such as 120. At the two ends of the path are cross-connects 122 and 124 which are designated as C-ring masters. Between the masters are a number of cross-connects called intermediate nodes, two of which are designated as 126 and 128. The C-ring path touches every node in the network at least one time, but a C-ring path may be allowed to pass through a node more than one time where necessary to provide a completed path to all nodes in the network.

Figure 6:
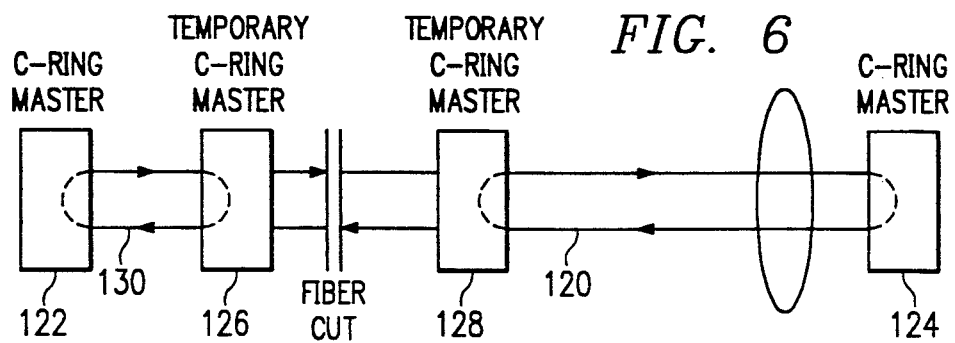
FIG. 6 illustrates the concept of FIG. 5 as to the communications between nodes after a cut occurs.

FIG. 6 illustrates the C-ring where there is a cut in the C-ring itself. Thus, there are two full duplex paths in FIG. 6 after the cut occurs with one path being the previously designated 120, and the other path being given a designation of 130. Although not illustrated, there would be, in all likelihood, additional intermediate nodes between 128 and 124, and between 122 and 126. During the interruption of the previous connection illustrated in FIG. 5, the end nodes 126 and 128 are altered to provide the capabilities of temporary C-ring masters for terminating the loop. Since the cut has occurred between nodes 126 and 128, each of these send signals to the remaining nodes on the loops indicating the failure span for the purpose of getting each of the remaining nodes in the network to implement the recovery plan whereby all of the interrupted communication channels providing traffic flow, including the C-ring, are reconnected via alternate paths to provide a continuation of traffic service.

Figure 7:
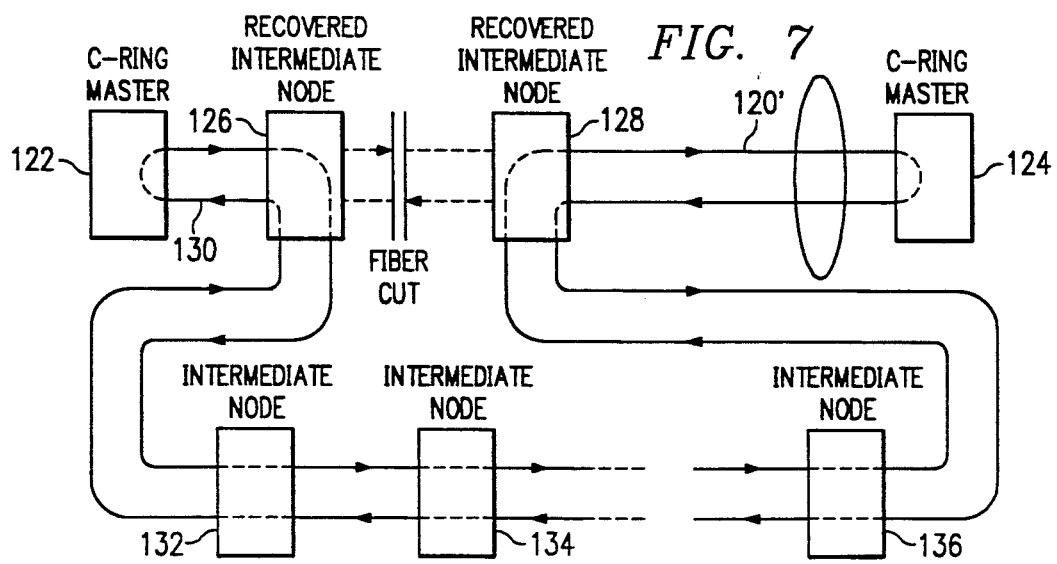
FIG. 7 illustrates the connection of the control network after restoration according to a plan, but before the cut is repaired, thus illustrating the repair of the control signal network by the same mechanism as repairs the other payload carrying circuits.

FIG. 7 illustrates the C-ring after recovery where the alternate paths are connected, and additional intermediate nodes 132, 134 and 136 are illustrated. In such a situation, the fiber cut between nodes 126 and 128 is compensated for by the reconnection or recovery plan which results in one communication path 120' which now goes from 128 through the nodes 136, 134 and 132 back to node 126 such that there is again only a single C-ring loop, and at this point, the temporary C-ring masters 126 and 128 are reverted to intermediate nodes.

FIG. 8 provides a flow diagram of a prior art approach at network restoration where the system awaits the detection of a failure and then attempts to provide alternate connections. In FIG. 8, a block 140 comprises apparatus used to detect various network events, and upon the detection of such an event, proceeds to decision block 142. If the event is not a DS3 or communication link failure, it returns to block 140. If it is a failure, then it proceeds to block 144. In block 144, all of the failed DS3 segments are identified, and the algorithm proceeds to a block 146. A determination is made in block 146 as to the two nodes terminating the failed segments and proceeds to block 148. In 148 the number of active channels is ascertained between the two nodes detected in block 146, and the algorithm proceeds to a block 150. An algorithm or mechanism is executed in block 150 which takes as input a pair of network node identifiers and a number k, and which generates as output a set of commands which when executed on the nodes of the network cause a set of connections to be established between the pair of nodes specified in the input and using DS3 segments taken exclusively from the spare capacity of the network. The algorithm proceeds from block 150 to block 152 where one set of commands is assigned to each failed channel, and then it proceeds to a block 154 where the resulting commands are executed on the network and finally, in block 156 the switch is made to the new paths for the traffic and restoration is completed. At this time, the mechanism or algorithm returns to block 140 and awaits the next network event.

FIG. 9 presents a flow diagram of an algorithm or mechanism to preplan possible network restoration in the event of each of many possible failures. A block 160 detects a network event and upon detection, proceeds to a decision block 162 which ascertains whether or not the event is a DS3 failure. Block 160 may see many different network events such as a DS3 failure, the addition of spare capacity to the network or the removal of spare capacity from the network. Each of these events affects the present algorithm. However, other events could be detected such as typical equipment maintenance operations, or the extraction of performance monitoring data. Such a network event would not directly affect the present algorithm. If it is a DS3 failure, it proceeds through blocks 164 and 166 to identify the failed segments and execute plans associated with those segments and then returns to block 160. If the event detected is not a DS3 failure, it proceeds to a decision block 168 to ascertain whether or not the event required a change in plans. If the event was the addition of spare capacity, and all potential cuts were satisfactorily resolved with alternate plans, the algorithm could return to block 160 and await the next network event. However, if the change was the addition of a communication path or the addition of spare capacity when all potential failures were not adequately covered, the algorithm would proceed to a block 170 to determine all segments that needed to be replanned because of the event involved. A block 172 determines all of the DS3 bundles containing those segments and then in block 174 a new set of plans is made for each of those bundles. After completion of block 174, the algorithm returns to block 160. Blocks 170 and 174 are expanded in the following figures.

FIGS. 10 and 11 expands block 170 of FIG. 9 and commences upon a determination that an event requires a change in plans in block 168 with determining whether or not the event is what is classified as a signal1 in decision block 176. If it is, it proceeds to a block 178 and adds all unprotected segments to a replan list. If it is not a signal1, the algorithm proceeds to decision block 180 to determine if this event is a plan request from another node. If it is, it proceeds to block 182 and adds a segment to he replan list. If the event is not a plan request from another node, it proceeds to decision block 184. Decision block 184 is the same destination as the algorithm would go after completing block 182. in block 184, a decision is made as to whether this event places a segment into service which now needs protection. If it does, it proceeds to block 186, and if the node is a sender a segment is added to the replan list. Once block 186 is completed or if block 184 decides that a segment is not added needing protection, the algorithm proceeds to decision block 188. In block 188, it determines whether or not this event removes a segment from service which had a plan. If the answer is yes, it proceeds to block 190 to erase the plan for this segment. While this portion of the algorithm is optional, it was included for completeness of concept. In either the event that block 190 is completed or the decision of block 188 is no, the program proceeds to block 192 of FIG. 11. In block 192, it is determined whether or not the event removes a segment from the spare capacity pool. If it does, it proceeds to block 193 to find all plans using this segment. Upon finding the plans, it proceeds to block 194 which is shown as a dash line block. For each plan that is found, it proceeds to block 195 and determines whether or not this node is a sender for the failure key. If it is not, it proceeds to block 197 and sends a replan request to the sender node, where it is handled at blocks 180 and 182 of that node's process, and if it is the sender, it adds the failure key to the replan list. When each of the plans has been completed, it proceeds to block 198. The decision block 192 proceeds directly to block 198 if there is a determination that the event does not remove a segment from the spare capacity pool. In block 198, a further optional decision is made as to whether or not the event adds a segment to the spare capacity pool. If it does, it proceeds to block 200 to send a signal1 to all nodes, where it is processed at blocks 176 and 178 of those node's processes. In either the completion of block 200 or the decision in block 198 that it does not add a segment to the spare capacity pool, the program proceeds to block 172 of FIG. 9.

FIG. 12 provides more details for block 174 of FIG. 9 wherein upon entering block 174, a procedure is commenced to reserve the network for planning a bundle in a block 202, and then the algorithm proceeds to a block 204 where a node pair for the problem bundle is determined. The program then proceeds to block 206 where the number of active channels in the bundle is determined whereupon it proceeds to a block 208. In block 208, the mechanism is executed with the ascertained node pair and the determined number of channels. In block 210, commands are added to each command set in each of the various affected nodes to switch interrupted traffic to the new path when so instructed upon detection of a DS3 failure. The mechanism then proceeds to block 212 to store each command set as a plan associated with its segment. The mechanism then returns to block 160 of FIG. 9 as so indicated in that figure to detect the next network event.

The flow diagrams of FIGS. 13 through 16 detail one embodiment of a mechanism of block 208 in FIG. 12. It should be noted that upon building of a network, each node is assigned a number and when a break occurs between two nodes, one of the nodes is designated a chooser, and the other is designated as a sender in accordance with some predetermined criteria such as numerical sorting order of these assigned node numbers. The mechanism of FIG. 13 assumes that there exists at each node in the network a list of all adjacent nodes and a list of all spare capacity available for restoration use connecting with each adjacent node. The next event of block 220 is the appearance of information from block 206 of FIG. 12, or a path hunt request generated from the mechanism of FIG. 13 as executed upon another node in the network. A determination is made as to whether it is a DS3 recovery request in which case it proceeds to a block 222 or a path hunt request wherein it proceeds to a decision block 224. If it is a DS3 recovery request, then there are k copies of process A of FIG. 14 commenced by block 222. The system then proceeds to a decision block 226 where it waits for a Kill signal or the fact that a path is found. As each path is found the port is added to the return list in block 228 and there is a check made to see whether or not there are any further processes left in a decision block 230. If there are, it returns to block 226. Typically, the Kill signal is a signal indicating that a long enough time has elapsed that if any paths are going to be found they will have been found and thus, a Kill signal is generated by some timing mechanism. If a Kill signal occurs, then the decision block 226 proceeds to a block 232 and kills all remaining copies of process A and returns to block 220 for the next event. When there are no processes left as determined by decision block 230, the algorithm also returns to block 220. If the next event happens to be a path hunt request rather than a DS3 recovery request, the decision block 224 proceeds to a block 234 if a process has been started for the index. In the context of this disclosure, an index is a reference for a given path search. If a process has been started, a new input message is sent to the process by block 234, and a return is made to block 220. If no process has been started for this index, the algorithm proceeds to a decision block 236 where a determination is made as to whether the node is a chooser or a tandem (intermediate), and if it is a chooser it proceeds to block 238 and commences a copy of process C detailed in FIG. 16, or if it is not a chooser, it proceeds to a block 240 where it starts a copy of process B as detailed in FIG. 15. This process starts the process B or C, but does not wait here for it to complete. This process goes to 220 to look for more path hunts (multiple searches progress simultaneously).

In FIG. 14 process A performs the sender function for one DS3 path hunt. It begins with information relative the index and the sender chooser node pair. In block 242, a request is made for a port to each adjacent node. The mechanism proceeds to block 244 where it waits for a further event. Once either a port assignment is made or a path is found, it proceeds. If a port assignment has been made, it proceeds to block 246 to send a start search to the state machine, illustrated in FIG. 17, for the assigned port. It then returns to block 244 to wait for the next event. If, on the other hand, the next event is a path found, from one of the assigned ports, it proceeds to a block 248 where it cancels all unfilled port requests. After the cancelation is made, it proceeds to a block 250 where a start available is sent to each assigned port except the port which found the path so that these other ports can be used for other search requests. It then proceeds to block 252 where all port assignments are released except for the successful port. The mechanism then proceeds to a block 254 to return the information as to the port which found a path to the parent task of FIG. 13. A block 256 indicates a termination of the process. It should be realized that the process of FIG. 14 is a substantially independent entity from the process of FIG. 13 after it is created. In other words, it does not return to block 220 of FIG. 13. It merely exists until it is terminated by completion or it is killed. Since a plurality of FIG. 14 flow diagrams are typically generated, block 220 of FIG. 13 is not reentered on a sender until all paths are found or until a kill is generated due to timing.

FIG. 15 details process B as set forth in block 240 of FIG. 13 where upon determining that the present port is a tandem rather than a chooser, the mechanism enters block 260 and requests a port for each of the adjacent nodes except the node from which the request was just received. The process B operates to perform the tandem or intermediate node functions for one DS3 path hunt. In other words, it is operational for one of the intermediate nodes between the sender and the chooser. Process B begins with information as to the sender-chooser port pair, an index and an initial FROM port. After the requests are made, the mechanism proceeds to a block 262 where it awaits the next event. If the next event is a port assignment, the mechanism proceeds to a block 264 and sends a "start search" to the assigned port and returns to block 262 to wait the next event. If the next event is a new input, a decision block 266 is entered where a decision is made as to whether or not the hop count is less than the current FROM port. If it is not less than the FROM port, the mechanism returns to 262 to await the next event since it already has a more efficient potential path. If it is less than the FROM port, it proceeds to a block 268 to make this port the new FROM port and returns to block 262 to wait for the next event. If the next event is that a path is found, it proceeds to block 270 where a cancelation is made of all unfilled port requests. It then proceeds to a block 272 to send "a start available" to each assigned port except the present port. It then releases all port assignments except the successful port in a block 274 and proceeds to a block 276. Block 276 results in sending a "send path found" message to the FROM port and connecting this port which has a path found to the FROM port. The mechanism then proceeds to block 278 to ignore all subsequent new input messages for that sender-chooser DS3 path hunt request regardless of their hop count since a path has been successfully found. The mechanism then proceeds to block 280 to terminate the process when there are no ports left to receive this index. The termination of all of the FIG. 15 mechanisms results in a return to the wait for next event block of 220 in FIG. 13. Similar to the situation with the sender, the process of FIG. 15 is terminated because the path found propagates back along the path until it becomes a path found on the sender node. On the tandem node, the flow diagram or algorithm of FIG. 13 has lost interest because the search has been completed. Thus, it is already back at block 220 starting other searches.

The process C of FIG. 16 occurs when the final node of the path hunt request is found, or in other words, the path hunt request arrives at the chooser node. The process begins with a sender-chooser port pair, an index, and an initial FROM port. In addition, there is a timing interval T1 which may be used to increase the probability of selecting the shortest path. Normally, this will be T1=0, or in other words, the mechanism will pick the first path found. However, the timer could be non-zero and is included in the mechanism flow chart for completeness and for compatibility with the use of the mechanism as a contingency planning tool. The commencement of the mechanism in FIG. 16 starts with a block 290 which starts a timer and proceeds to a block 292 to wait for an event. If the event is a new input, it proceeds to a decision block 294 and checks to see if the hop count is less than the FROM port. If it is not, it returns to block 292. If it is less than the FROM port, it proceeds to a block 296 and makes this port the new FROM port. If, on the other hand, a timeout has occurred, the mechanism proceeds to block 298 where it sends a path found on the FROM port. It proceeds to a block 300 where it ignores all subsequent new input messages and then proceeds to a block 302 for terminating the process when there are no ports receiving the index.

Each individual port such as 32 of FIG. 1 in combination with the I/O processor 22, performs given functions depending upon the signals appearing on the control leads and the DS3 data channel. FIG. 17 provides a state transition table for describing the state machine operation for each of these individual port send/receive pairs that are in the spare pool. The lefthand column of FIG. 17 has designators adjacent thereto whereby each of the rows is designated from 17A through 17G. Row 17A designates the action occurring in the way of change of signal being received by the port. Row 17B describes the situation where the port is available to receive or to send. The State of 17C describes the situation where the port is in a condition of receiving a search and is available to send a message. The State 17D describes the situation where the port is receiving a search and is sending the complement. This is a terminal state for the machine and at this point, the port is reserved for restoration and is no longer in the spare pool. Similar comments apply to the states outlined in Rows 17E, F and G. Columns 2 through 5 across the top in Row 17A describe the signals received by the port on the DS3 line. In other words, the port can ascertain when the signal on a line changes to search as stated in the second column or changes to complement as indicated in the third column or changes to available for the fourth column or the hop count decreases in a received search signal. Columns 6 through 8 describe signals received through the I/O processor from the administrative controller such as block 18 of FIG. 1. The command of Column 6 indicates the port receiving a start search command while Column 7 shows the application of a start available command, and Column 8 is a start complement command. In the top half of each cell is an action which occurs as a result of the receipt of the signal indicated at the top of the Column (17A) while the mechanism is in the state indicated by Column 1 of that row. The bottom half of each cell indicates the new state (row) entered upon completion of this action. As an example, if the port is in the receive available/send available condition of Row 17B and receives a signal change to search as found in Column 2, this results in a path hunt request alert, which will be handled in 224 of FIG. 13, and changes the port to "receive search, send available", or in other words, th eport transits to Row 17C and awaits one of the signals of Columns 4, 5, 6 or 8. If the next signal received is a signal changing to available, the port aborts the search and returns to the State of 17B. If the hop count decreases in the search, it porvides a path hunt request and stays in the same state. If it receives a start search command from the administrative controller 12 of FIG. 1, it will supply a send search and change to a "receive search, send search" state of 17F. Finally, if it receives a start complement command from the administrative controller as indicated in Column 8, it will send that signal and transit to the "receive search, send complement" state of 17D which, as previously indicated, is the terminal state for this port until a provisioning action returns the port to the spare capacity pool. (Once placed in service, there is no C-bit channel on the DS3, so it cannot be used.)

It should be again noted that an index is a term used in FIG. 13 and elsewhere to refer to a specific one of the K copies of the search process so a given node will know whether or not a path hunt request has already been received and/or for the purpose of comparing hop counts.

OPERATION

The prior art describes solving the problem of a distributed path search in a circuit switched network by several variations of a flooding algorithm. Several techniques have been used to solve related problems in packet switched networks. All of these solutions can be characterized by the sequence of identify the failure, plan an alternate route, and connect the alternate route. A flow diagram is provided in FIG. 8 of the basic operation of one such prior art approach. This is a brief flow diagram of the approach used in the referenced patent to Grover. To date, no known prior art has succeeded in implementing these solutions in anything approaching the 1.5 second speed required to prevent disabling a local office. The planning phase of the prior art approach would typically take the longest time although the approach used by some user's prior art techniques in communicating the connection route to the various nodes also provided significant time delays.

The present invention overcomes the prior art deficiencies by planning alternate paths, storing information related to all of these paths, and then when a failure occurs identifying the place of the failure and connecting an alternate route around the failed area. By performing the route search in advance of the failure, a significant decrease in the time between failure and reconnection can be realized. The price of this reduction is a more complicated route searching procedure. Above and beyond the more complicated route searching procedure, there is a need to store the contingency plans between the computation of the planned alternate paths and the execution of recovery connection. A mechanism is needed to activate the plans once a failure occurs so that the proper alternate route is quickly connected and the concept must have a mechanism for responding to changes in the network which cause plans to become invalid so that appropriate new plans can be computed and stored.

From an observation of the various figures including the representation of the node in FIG. 1, a generalized illustration of a simple network in FIGS. 2 through 4, and the flow diagrams of FIGS. 9 through 16 along with the state diagram of FIG. 17, it may be realized that the basic sequence of events in my method proceeds along the following lines. When a new node is placed in service, it is assigned a "network unique" node identifier by which it is known to all other nodes in the network. There is a computable ordering among these identifiers so that any node can compare its number to that of any other. When a new node is placed in service, two of its communication channel ports such as DS3, will be dedicated to supporting a broadcast communications ring labeled in FIGS. 2 through 7 as a C-ring. These two ports will be connected together within the node, and their channels will be part of the broadcast communications ring coming from the adjacent nodes. The connections at the adjacent nodes will also be modified so as to route the ring to the new node. One embodiment of the inventive concept used the C bit parity channel on the idle signal to effect this communication.

When a new physical communication channel (DS3) between two nodes is placed in service, the two nodes exchange messages over that link and determine a network unique channel number for that channel. As with the broadcast communication ring, one embodiment of the inventive concept used the C-bit parity channel on this link to establish the network unique channel number. The identification also associates the new channel with a "bundle" of channels between the same two nodes. It should be realized that typically a bundle of channels would be physically positioned such that the failure of one due to a device such as a back hoe would be likely to cause failure of all those in a bundle. However, a pair of nodes may have several such bundles connected therebetween yet physically separated. When a new physical communication channel between two nodes is placed into service, the node will assume that it is available for use as spare capacity within the network.

Because spare capacity has just been added by the placing in service of a new physical channel, the two nodes hosting the channel will check to determine if there are any unprotected channels in the network. If there are such channels, an algorithm will be invoked to attempt to protect them using the newly installed capacity. When a connection is created or modified within the node and that connection is placed "in traffic service", any spare channels used in establishing this new path may have been components of one or more contingency plans recorded within the network for the protection of other channels. Thus, a survey is conducted of the plan database within the node to identify any other channels which were counting on the (now available) spare capacity. The custodial nodes of each such identified channel are notified of the need to initiate a replan session. Hence, the node places a bid on the broadcast ring (the C-ring) for an opportunity to replan. When a node receives a message suggesting a replan, it places a bid on the broadcast ring for the opportunity to replan. A mechanism or algorithm comprising a part of the C-ring or broadcast ring will resolve the order of replanning so that only one bundle is planned at a time.

When a node receives permission to replan, it initiates a variation of a prior art flooding algorithm. It will be noted, however, that the environment in which the algorithm is running is not the same. That is, there is no failure in the current network, and a connection is not generated at this time. All that is generated is a plan for connection which needs to be stored. The connection plan is stored on a distributed basis where appropriate portions of the plan are stored at each node in the alternate path connection scheme.

The replanning process for each bundle proceeds along the following lines. The two nodes hosting the bundle are aware of each other's node number as indicated previously. The lower number in one embodiment of the invention is the sender and the higher number is the chooser. The sender is the node that bid and received permission to plan. The sender identifies the number of channels within the bundle which require protection. In other words, those channels that are in active or traffic service. For each of the remaining steps in the replan operation, the sender ignores any spare capacity in the bundle for which it is planning. This simulates a complete cut of that bundle. The sender identifies all adjacent nodes to which it has spare capacity. For each channel in need of protection, the sender sends a unique search message or signature which would correspond to the "start search" command of FIG. 14, and as set forth in the state transition table of FIG. 17. For each channel in need of protection, the sender selects one spare channel to each adjacent node and issues a path search request including the search signature along that spare channel. The node remembers the association between channel and signature. Whenever the sender encounters an adjacent node to which there is spare capacity but to which all spare capacity has been previously associated with another search signature, it places the waiting signature in queue for that node. The search signatures issued by the sender will arrive at the adjacent nodes. These nodes are called tandem nodes or intermediate nodes if they are neither sender or chooser. Upon receipt of a search signature, an intermediate node selects a spare channel to each further adjacent node and replicates the search signature on each. As occurred at the sender, signatures are queued for nodes to which all spare capacity has been previously associated with a different signature. When a tandem or intermediate node forwards the search signature, it bumps a "hop count" to indicate the number of nodes that the search has traversed.

When a tandem node receives the same search signature from more than one channel, it selects the channel with the lowest hop count as outlined in decision block 226 of FIG. 15, and if necessary, updates the hop counts of the outgoing signatures. The intermediate node retains the association between the input channel and the output channels.

Eventually, the chooser node will receive a search signature as set forth in FIG. 13 and the process C of FIG. 16. The chooser may wait for a guard timing period as set forth in block 292 to see if a better path (lower hop count) arrives. The chooser then issues a complementary signature in the reverse direction on the selected channel. After this, it ignores any other receipt of the same search signature. The intermediate nodes receive the complementary signature on one of its channels and when it does, it finds the associated incoming channel and propagates the complementary signature back along that associated channel as set forth in the transition table of FIG. 17.

When an intermediate node propagates a complementary signature, it identifies all of the other outgoing channels associated with that incoming channel and releases the association as set forth in FIG. 15. Thus, the association between the incoming and outgoing signals has been reduced from one-to-many to one-to-one, and this association of incoming to outgoing messages is, in turn, associated with a search signature.

When a channel is released from association with a given search signature because a complementary signature has been propagated, that channel is made available to other signatures or messages which may be queued for the node to which the channel goes. Thus, the discovery of one path frees resources which may contribute to the completion of another search. This release is set forth in the state transition table in the seventh column, Row 17E, where the port is returned to the initial State of 17B.

The complementary signature will retrace its path back to the sender. When the sender receives a complementary signature, it is an indication that one search has been completed successfully. The sender, like the intermediate nodes, frees all other channels associated with the completed search and makes them available to any queued searches. The sender then chooses the highest priority channel (where there is a priority indicated), and which priority is not illustrated in the flow diagrams, for which the search is being conducted and associates that channel identifier with that search signature. A message associating the channel identifier and the search signature is sent down the discovered path. This is called the confirmation message.

When an intermediate node receives a confirmation message, it builds a plan in its plan database associating the given channel index or identifier (from the confirmation message) with the connection of the incoming outgoing pair it associated with the search signature (as obtained from the confirmation message). Thus, the tandem node will know what connection to make in the event that it is notified of the failure of the given channel.

When the chooser node receives the confirmation, it also records its portion of the plan and returns a confirmation reply. The intermediate nodes simply relay this confirmation reply. The receipt by the sender of the confirmation reply indicates that the plan is in place for the associated channel. A hop count limit may be utilized in the invention. In such a case, an intermediate node receiving a signature with a hop count exceeding a predetermined limit, may refuse to propagate the signature. As set forth in block 226 of FIG. 13, a mechanism is provided to terminate the search in the event that all searches have not been completed successfully within a given period of time. While Kill signals could be received by a node for other reasons, this would be the reason for a Kill signal in this instance. If a search is terminated by this mechanism, the sender notifies all nodes that there exists unprotected channels in the network. The sender also drops all remaining outgoing search signatures and clears all queues of the searches still waiting.

When one bundle search terminates, the sender initiates his next bundle search for which it is a sender if it has further bundles. When a node completes all searches for which it is a sender, it relinquishes its search permission, and the arbitration mechanism within the C-ring selects the next node from those requesting search permission. When there are no pending requests for search permission remaining, the network becomes quiescent with respect to restorations until either a failure occurs or another provisioning change stimulates more planning. When a failure occurs, the fault isolation mechanism within the appropriate nodes must identify the two nodes hosting the failed channels. This mechanism is addressed in my previously filed patent application Ser. No. 562,785, filed Aug. 6, 1990, and assigned to the same assignee as the present invention. This mechanism is incorporated by reference into this application. When a node detects a failure, it checks to see if it has a valid plan for that channel. If not, it may institute a failure time recovery scheme not comprising a part of the present disclosure. However, if a valid plan exists as would typically be the case for the purposes of the present concept, the node issues an activation request over the broadcast or C-ring network. Upon receipt of an activation request, a node checks its plan database. If it holds a valid plan for the channel, it executes the associated connection operation. The sum of all of the operations at each participating node in the network provides an alternate path for the interrupted payload and restores service to all of the active channels in that bundle. Thus, restoration has been completed.

As previously indicated, FIGS. 2 through 4 indicate a very small sample network to provide a simple illustration of how the nodes interact. As illustrated, a single active channel extending from 93 to 94 enters Node A goes to Node D and exits at Node C. The shaded line connections between the various nodes from 95 to 103 and specifically including 101 show spare capacity available. The designators from 105 to 111 illustrate the broadcast network or the C-ring network. If a cut occurs between Node A and D, a signal designated as AIS by the telephone carriers is generated. The nodes A, D and C detect the incoming AIS signal and convert to outgoing idle signals and begin timing. The AIS signal changes to an idle signal at Node C and Node C stops converting and passes the incoming signal. Node C also cancels an internal timer and decides that failure is not its responsibility. A timer expires in Nodes A and D, and since the AIS signal is still present, each of them now know that the link between A and D has failed, and they begin to plan activation. This is outlined in my referenced previously filed patent application.

FIG. 3 illustrates a stored plan for restoration. Node A stores the fact that it needs to "roll the port ADx to ABy" if it is notified of a failure of ADx. Node B stores, as its portion of the plan, "connect ABy to BDz" if it is notified of the failure of ADx. Node C is not involved directly in the restoration and thus, nothing is stored at Node C. Node D has, as its portion of the plan, "roll port ADx to port BDz" upon notification that there has been a failure of the channel ADx.

As illustrated in FIG. 4, the plan activation occurs upon Node A signaling a failure of the ADx channel due to the break in channel 101 on the communications ring or C-ring commencing with lead 105 and continuing to further nodes. It should be noted that actually both Nodes A and D would output the signal if the failure is duplex, and the signal will be issued in both directions on the ring. All nodes see the ADx failure signal on the ring and execute their portion of the ADx plan as outlined in FIG. 3. The execution of the plan causes the traffic to roll to the alternate path illustrated in dark lines in FIG. 4. The Rockwell RDX 33 switches incorporated in one embodiment of the inventive concept are able to monitor messages on the C-ring while the signal passes therethrough uninterrupted. Thus, all nodes in the network will receive the failure signal substantially instantaneously. Such instantaneous broadcast communication comprises an integral part of the present inventive concept.

While I have set forth the basic operation of one embodiment of the inventive concept which is implemented by the flow charts provided along with the state transition table in each of the nodes as illustrated in FIG. 1, I wish to emphasize that this is only one embodiment of my inventive concept as practiced in one type of switching mechanism. The inventive concept is broader than the specific embodiment shown, and thus, I wish to be limited only by the scope of the appended claims wherein

I claim:

1. The method of re-establishing communication between a given pair of nodes of a network having an arbitrary number of uniquely identified nodes and an arbitrary number of spans interconnecting said nodes, each said span having working circuits between nodes designated for transmitting actual communications traffic and many of said spans having spare circuits between nodes capable of, but not designated for, transmitting actual communications traffic, each working and spare circuit having a network unique identifier and each node being connected in a communication loop with all other nodes in the network, said method comprising the steps of:
   a) monitoring the spare circuit node interconnection structure of the network and initiating a preneed alternate multinode connection plan between said pair of nodes whenever there is a change in network capacity affecting previously planned alternate circuit interconnections between said nodes;
   b) establishing the route for at least one multinode alternate communication path between said pair of nodes as part of said preneed plan by,
      1) a predetermined one SENDER, of said pair of nodes sending separate path search requests out over spare channels, other than those directly connecting said pair nodes, to other network nodes for each working channel between said pair of nodes needing protection, directed ultimately to the other, CHOOSER, of said pair of nodes, each of the separate search requests having a unique "signature" identifier,
      2) each node, other than the CHOOSER node, receiving a search request forwarding same on at least one further spare channel while incrementing a "hop" count associated with the request to indicate the number of nodes the search has traversed,
      3) each node receiving multiple search requests having the same "signature" selecting only the one of said multiple having the lowest "hop" count for forwarding to other nodes,
      4) the CHOOSER node selecting the search request having the lowest "hop" count for each "signature" and returning information to the SENDER as to the internode route and specific spare channels used for each search request,
      5) storing information gathered as a result of the sending of the search requests as a preneed plan in each of said SENDER and CHOOSER nodes for use in the event of a loss of direct communications between said pair of nodes; and
   c) implementing said preneed plan upon detection of a loss of direct communications between said pair of nodes.

2. The method of restoring communications between any given pair of nodes of a network having an arbitrary number of nodes and arbitrary number of spans interconnecting said nodes, each said span having working circuits between nodes designated for transmitting actual communications traffic and many of said spans having spare circuits between nodes capable of, but not designated for, transmitting actual communications traffic, each node being normally connected in a communication circuit with all other nodes in the network, said method comprising the steps of:
   a) monitoring the spare circuit node interconnection structure of the network and initiating a preneed alternate interconnection plan between said pair of nodes whenever there is a change in network capacity affecting previously planned alternate circuit interconnections between said nodes;
   b) establishing the preneed alternate route for each working circuit to be protected as part of said plan by,
      1) sending out search requests on spare circuits connected to nodes other than said pair of nodes by one of said pair of nodes and addressed to the other of said pair of nodes,
      2) marking the search request at each hop on the way to its destination with the route taken and incrementing the request as to the number of hops required to reach the other of said pair of nodes,
      3) selecting a route from those requests received at the other of said pair of nodes based on an arbitrary logical basis,
      4) communicating the selected route to the one of said pair initiating the search request,
      5) storing the selected route in the preneed plan, and
      6) repeating steps 1 to 5 for each remaining working circuit to be protected using routes other than those already selected for the present preneed plan;
   c) monitoring active traffic signals between said pair of node for a loss of communications therebetween; and d) implementing said preneed plan upon detection of a loss of direct communications between said pair of nodes.

3. The method of restoring communications between any given pair of nodes of a network having an arbitrary number of nodes and arbitrary number of spans interconnecting said nodes, each said span having working circuits between nodes designated for transmitting actual communications traffic and at least some of said spans having spare circuits between nodes capable of, but not designated for, transmitting actual communications traffic, each node being able to managerially communicate with all other nodes in the network, said method comprising the steps of:

a) establishing a set of preneed alternate routes for a span of working circuits between said given a pair of nodes to be protected as part of a preneed plan by,
   1) sending out search requests on spare circuits connected to nodes other than said pair of nodes by one of said pair of nodes and addressed to the other of said pair of nodes,
   2) selecting a route from those search requests received at the other of said pair of nodes,
   3) storing the selected route as part of the preneed plan in at least one of said pair of nodes, and
   4) repeating steps 2 and 3 for each remaining working circuits to be protected using routes other than those already selected for the preneed plan; and
b) implementing said preneed plan upon detection of a loss of direct communications between said pair of nodes.

4. A node to be used in a network of communicating identically constructed nodes having a number of spans interconnecting said nodes, each said span having working circuit channels between nodes designated for transmitting actual communications traffic and at least some of said spans having spare circuit channels between nodes capable of, but not designated for, transmitting actual communications traffic, each node being able to managerially communicate with all other nodes in the network for the purpose of establishing alternate traffic routes in the event of loss of a span between a given pair of nodes where the given pair of nodes may be set to SENDER and CHOOSER states for the purpose of a specific preneed alternate route plan and all other nodes may be set to TANDEM states, the SENDER and CHOOSER state nodes sending search requests, search request replies, confirmations and confirmation replies therebetween indirectly using the nodes in the TANDEM states as part of the preplanning actions, comprising, in combination:

plan database storage means;
means for detecting when said node is in the TANDEM state;
means for receiving search requests on a spare circuit channels;
means for logically selecting outgoing spare circuit channels to adjacent nodes and replicating thereon an updated version of a received search request for a given working channel to be protected;
means for propagating search request replies to the sender back along the same spare channel as the search request orginally traversed;
means for receiving and for propagating confirmation messages to the CHOOSER;
means for recording in its plan database storage means plan connections to be made when said node is notified of the failure of a given working circuit channel between said SENDER and CHOOSER nodes in accordance with information retrieved from received and propagated confirmation messages;
means for propagating confirmation replies back to the SENDER; and
means for responding to a received plan activation request for a given channel by checking the stored plan in said plan database storage means to see and executing the associated connection operation if that channel is referenced.

5. A node to be used in a network of communicating identically constructed nodes having a number of spans interconnecting said nodes, each said span having working circuit channels between nodes designated for transmitting actual communications traffic and at least some of said spans having spare circuit channels between nodes capable of, but not designated for, transmitting actual communications traffic, each node being able to managerially communicate, on a broadcast link, with all other nodes in the network for the purpose of establishing alternate traffic routes in the event of loss of a span between a given pair of nodes where the given pair of nodes may be set to SENDER and CHOOSER states for the purpose of establishing a specific preneed alternate route plan and all other nodes may be set to TANDEM states, the SENDER and CHOOSER state nodes sending search requests, search request replies, confirmations and confirmation replies therebetween indirectly using the nodes in the TANDEM states as part of the preplanning actions, comprising, in combination:

plan database storage means for storing preneed alternate connection data necessary to promptly implement switching traffic from failed communication channels to operable spare circuit channels;
broadcast link input and output ports;
first monitoring means for initiating an update of alternate connection data stored in said plan database storage means whenever a predetermined change is detected in the spare circuit capacity of the network to which the node is connected;
second monitoring means for toggling said node between a PLAN state and a NOPLAN state as a function of whether or not the stored plan has been updated in accordance with predetermined changes in the current spare capacity of the network to which the node is connected; and
means for activating alternate connection operations as set forth in the plan database storage means when said node is placed in a SENDER state because of a present working circuit channel failure and node is not in a NOPLAN state.

6. A method of restoring protected circuit traffic communications between a pair of nodes, between which commincations have been broken, in a network having an arbitrary number of nodes and arbitrary number of spans interconnecting said nodes, each said span having working circuits between nodes designated for transmitting actual communications traffic and many of said spans having spare circuits between nodes capable of but, not designated for, the transmission of actual communications traffic, said method comprising the steps of:

a) designating one of each pair of nodes terminating each span a SENDER node for an instance of failure of that specific span and designating the other as a CHOOSER node for each span in the network in accordance with a predetermined algorithm, all other nodes in the network for a specific span failure being designated as TANDEM nodes;

b) storing a preneed alternate connection plan in each node using spare circuit capacity, said alternate connection plan at each node containing data for switching actions of that node whether acting as a SENDER, CHOOSER or TANDEM node for each of a plurality of given working circuit failures occurring between SENDER and CHOOSER;

c) updating the preneed alternate connection plan at each affected node when there is a change in network spare circuit capacity;

d) activating the switching of network traffic to spare circuits in accordance with the preneed plans stored in the nodes upon detection of the failure of protected traffic circuits.

7. The method of claim 6 where the communications broken include traffic circuits and network managerial circuits comprising the additional steps of:

providing for priority assignments of circuits to be protected in instances where there are less spare circuits available than there are circuits in a span to be protected; and switching managerial and traffic circuits to spares circuits in the priority orders listed in the plan until all available spares circuits are used.

8. The method of claim 7 comprising the additional steps of:

storing any network broadcast indication of added spare circuit network capacity since the last preneed alternate connection plan update was performed for a given node; and switching a given node to a real time restoration mode when (1) said given node is a SENDER node and (2) there is a stored indication of additional spare circuit capacity and (3) all spare circuits listed in the preneed plan have been activated and (4) there are still broken communication circuits to be switched.

9. An apparatus for restoring communications between any given pair of nodes of a network having an arbitrary number of nodes and an arbitrary number of spans interconnecting said nodes, each said span having working circuits between nodes designated for transmitting actual communications traffic and at least some of said spans having spare circuits between nodes capable of, but not designated for, transmitting actual communications traffic, each node being able to managerially communicate with all other nodes in the network, each node in the apparatus comprising, in combination:

a) first means for establishing a set of preneed alternate routes for a span of working circuits between said given pair of noded to be protected as part of a preneed plan, said first means, including, 1) means for sending out search request on spare circuits connected to nodes other than said pair of nodes by one of said pair of nodes and addressed to the other of said pair of nodes, 2) means for selecting a route from those search requests received at the other of said pair of nodes, 3) means for storing the selected route as part of the preneed plan in at least one of said pair of nodes, and 4) means for repeating the operations of paragraphs 2 and 3 for each remaining working circuits to be protected using routes other than those already selected for the preneed plan; and b) second means for implementing said preneed plan upon detection of a loss of direct communications between said pair of nodes.

10. A method of restoring protected circuit traffic communications between any given pair of nodes, between which communications may be broken, in a network having an arbitrary number of nodes and an arbitrary number of spans interconnecting said nodes, each said span having working circuits between nodes designated for transmitting actual communications traffic and many of said spans having spare circuits between nodes capable of but, not designated for, the transmission of actual communications traffic, each node in the network being capable of operating in a SENDER, CHOOSER or TANDEM mode wherein said given pair of nodes for a specific span comprises a SENDER at one end and a CHOOSER at the other and all other nodes in the network operate in the TANDEM mode, said method comprising the steps of:

a) each SENDER node, as part of a preneed plan, making a network request for permission to setup a set of alternate connection in stored memory where the requests are granted in accordance with a predetermined algorithm;

b) a SENDER, upon receiving permission to plan, sending out search request on spare circuits connected to TANDEM nodes and addressed to the CHOOSER node of said pair of nodes;

c) each TANDEM node logically forwarding received search requests toward said CHOOSER after storing information as to identify of circuit to be protected, the identity of the spare circuit upon which the request was received and the identity of any outgoing spare circuit upon which the search request was forwarded;

d) each TANDEM node reserving each outgoing spare circuit from use by other search request;

e) the CHOOSER node selecting from between any search requests for the same protected circuits, recording in memory its portion of the plan, and returning a reply back to the SENDER along the same route that the request traversed to reach the sender;

f) each TANDEM node releasing spare circuits previously reserved when it first received a search request for a specific working circuit to be protected upon other than the spare circuit upon which the reply is received;

g) the SENDER storing in memory the spare circuit from which the reply is received and that the working circuit associated therewith is now protected; and h) a SENDER, having a preneed plan completed, activating said plan upon detecting that at least one protected working circuit between itself and the associated CHOOSER has failed.

11. The method of restoring communications between any given pair of nodes of a network having an arbitrary number of nodes and an arbitrary number of spans interconnecting said nodes, each said span having working circuits between nodes designated for transmitting actual communications traffic and many of said spans having spare circuits between nodes capable of, but not designated for, transmitting actual communications traffic, each node being normally connected in a communication circuit with all other nodes in the network, said method comprising the steps of:

a) monitoring the spare circuit node interconnection structure of the network and initiating a preneed alternate interconnection plan between said given pair of nodes whenever there is a change in network capacity affecting previously planned alternate circuit interconnections between said nodes;

b) establishing a preneed alternate route for each interconnected given pair of nodes to be protected as part of said plan;

c) monitoring active traffic signals between said pair of nodes for a loss of communications therebetween; and d) implementing said preneed plan upon direction of a loss of direct communications between said pair of nodes.

12. The method of restoring communications between any given pair of nodes of a network having an arbitrary number of nodes and an arbitrary number of spans interconnecting said nodes, each said span having working circuits between nodes designated for transmitting actual communications traffic and at least some of said spans having spare circuits between nodes capable of, but not designated for, transmitting actual communications traffic, each node being able to managerially communicate with all other nodes in the network, said method comprising the steps of:

a) establishing a set of preneed alternate interconnecting routes for a span of working circuit between said given pair of nodes to be protected as part of a preneed plan;

b) implementing said preneed plan upon detection of loss of direct communications between said pair of nodes.

13. An apparatus for restoring communications between any given pair of nodes of a network having an arbitrary number of nodes and an arbitrary number of spans interconnecting said nodes, each said span having working circuits between nodes designated for transmitting actual communications traffic and at least some of said spans having spare circuits between nodes capable of, but not designated for, transmitting actual communications traffic, each node being able to managerially communicate with all other nodes in the network, each node in the apparatus comprising, in combination:

a) first means for establishing at least one preneed alternate interconnecting route for a span of working circuits between said given pair of nodes to be protected as part of a preneed plan; and b) second means for implementing said preneed plan upon detection of a loss of direct communications between said pair of nodes.

14. Apparatus for restoring communications between any given pair of nodes of a network having an arbitrary number of nodes and an arbitrary number of spans interconnecting said nodes, each node being able to managerially comminicate with at least adjacent nodes in the network, each node in the apparatus comprising, in combination:

a) first means for establishing at least one preneed alternate interconnecting route for each span of working circuits between said apparatus and each adjacent node having a span to be protected as part of a preneed plan; and b) second means for implementing said preneed plan upon detection of a loss of direct communications between said apparatus and an adjacent node covered by the preneed plan.

15. The method of communicating between intelligent nodes in a DS3 type traffic signal communication network comprising the steps of:

interconnecting all nodes using spare capacity DS3 channels to form a communications loop;

transmitting idle format signals around the loop as an indication of loop integrity;

intermixing control signal bits with said idle format signals to provide broadcast communications with all nodes connected to loop in the form of continuously circulating messages; and detecting the control signal bits of the circulating messages at each node.

* * * * *